July 4, 1950 — S. GUBIN — 2,513,477

OMNIDIRECTIONAL RADIO RANGE

Filed Feb. 14, 1946

INVENTOR.
Samuel Gubin
BY
ATTORNEY

Patented July 4, 1950

2,513,477

UNITED STATES PATENT OFFICE 2,513,477

OMNIDIRECTIONAL RADIO RANGE

Samuel Gubin, Philadelphia, Pa., assignor to Radio Corporation of America, a corporation of Delaware Application February 14, 1946, Serial No. 647,599

4 Claims. (Cl. 343—102)

This invention relates to improvements in radio aids to the navigation of aircraft, and more particularly to course indicator systems for use with omnidirectional radio ranges.

In general, the omnidirectional range radiates two signals: one which varies in some characteristic, such as phase, in accordance with the bearing from the range, and another which does not vary, but serves as a reference for comparison with the first. The range signals are received on the aircraft, where they are compared with each other to provide direct indication of the bearing of the craft from the range station. A typical omnidirectional range system is described in U. S. Patent No. 2,253,958.

For flight along a radial line through the range station, it is desirable to have an indicator of the familiar "left-right" type to show any deviation of the craft from the desired course. Such indicator systems have been devised for use with omnidirectional ranges. Ordinarily they include an adjustable phase shifter for setting the phase of the reference signal to correspond with the bearing of the desired course, and a phase comparison circuit or wattmeter device with a zero center indicator meter. As long as the aircraft is on the selected course line, the meter reads zero. When the craft is off course to the left or right, the meter is deflected accordingly.

Prior art systems of the described type require adjustable phase shifters of high precision, which are costly. Moreover, they inherently introduce a troublesome ambiguity in the course indications, because reciprocal settings i. e. 180° apart, are not distinguished. Thus, the phase comparison circuit will act the same when the course selector is set for 270° as when it is set for 90°.

It is the principal object of the present invention to provide an improved course indicator for omnidirectional radio range systems.

More specifically, it is an object of this invention to provide indicators of the described type wherein the use of precision adjustable phase shifters is avoided.

Another object is to provide a course indicator system which is not ambiguous.

A further object of the invention is to provide a device of the described type which is relatively inexpensive and simple, and may be readily designed to meet typical space and weight requirements of small aircraft.

Figure 1:
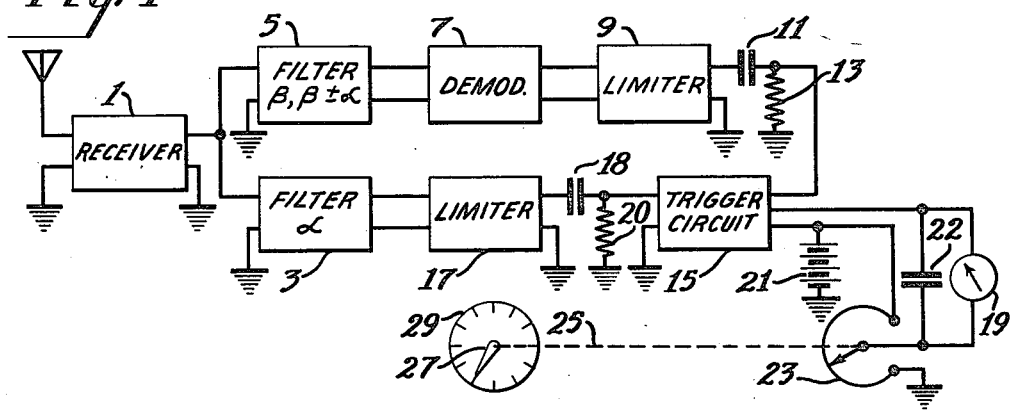
Figure 2:
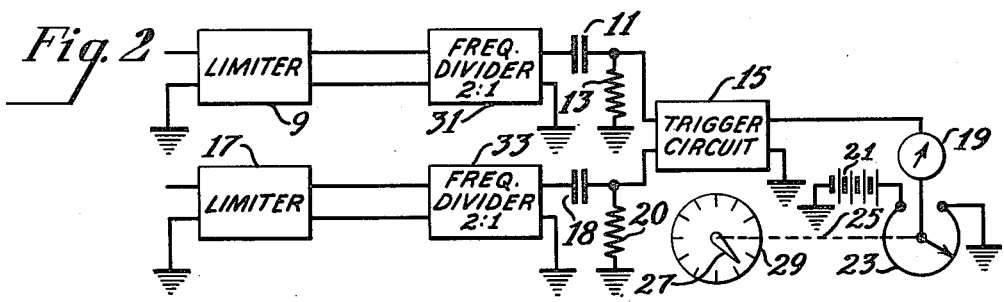

The invention will be described with reference to the accompanying drawings, of which:

Figure 1 is a schematic block diagram of a course indicator system embodying the instant invention, Figure 2 is a schematic diagram of a modification of the system of Figure 1, and Figures 3, 4, 5, 6 and 7 are oscillograms illustrating the operation of the system of Figures 1 and 2.

For the purpose of illustration of the present invention, an omnidirectional range of the type described in the aforementioned Patent No. 2,253,958 is assumed. Refer to Figure 1. The beacon itself is not shown. It is sufficient for the present explanation to state that the beacon radiates a single carrier with variable phase modulation of one frequency $\alpha$ and a sub-carrier modulation of frequency $\beta$ modulated in turn with a constant phase signal of frequency $\alpha$.

The equipment to be carried on an aircraft includes a radio receiver 1 capable of receiving the doubly modulated range signal. A filter 3 separates the variable phase signal of frequency $\alpha$ from the receiver output, and a second filter 5 separates the subcarrier of frequency $\beta$, together with its constant phase sidebands of frequencies $\beta+\alpha$ and $\beta-\alpha$.

The modulated subcarrier signal is demodulated by a demodulator 7, providing a constant phase output of frequency $\alpha$. This is the reference phase signal, and is applied through a limiter circuit 9 to a voltage differentiating circuit comprising a small capacitor 11 and a resistor 13. The output of the differentiating circuit appears across the resistor 13, and is applied to one of the inputs of a trigger circuit 15.

The trigger circuit 15 may be one of the several types described in Reich, "Theory and Applications of Electron Tubes," first edition, pages 206–210, or any other known type of similar circuit, subject only to the condition that it provides an output capable of being started by a pulse applied to one point in the circuit and stopped by a pulse applied to another point in the circuit.

The directional phase signal, comprising the output of the filter 3, is applied through a limiter 17 and differentiating circuit 18, 20 to the other input of the trigger circuit 15. The output terminals of the trigger circuit 15 are connected respectively to one terminal of a meter 19 and to one terminal of a D.-C. source 21.

An adjustable voltage divider 23 is connected across the source 21, with its movable tap connected to the other terminal of the meter 19. The manually operable control shaft 25 of the voltage divider 23 is provided with a pointer 27 movable over a scale 29 to indicate the adjustment of the voltage divider 23. The scale 29 is calibrated in degrees or other angular units.

Figure 3:
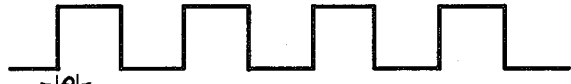
Figure 4:
Figure 5:
Figure 6:

In the operation of the system of Figure 1, the reference phase output of the demodulator 7 is amplified and limited by the limiter 9, providing a constant phase square wave voltage, shown in Figure 3. The resistor-capacitor combination 11, 13 differentiates the square wave, providing a positive pulse 51 (see Figure 5) at the beginning of each square wave and a negative pulse 53 at the end of each square wave.

Similarly, the limiter 17 provides a square wave output (shown in Figure 4) which differs in phase from that of the limiter 9 by the angle $\theta$, which is the bearing of the receiver equipment from the range station. The differentiating circuit 18, 20 provides positive pulses 61 (Figure 6) in response to the leading edges of the output waves of the limiter 17, and negative pulses 63 in response to the trailing edges. Each pulse 61 is delayed with respect to the next preceding pulse 51 by a time $$t = \frac{\theta}{360°} \cdot \frac{1}{\alpha}$$

where $\alpha$ is the frequency of the reference and directional phase signals in cycles per second.

Each pulse 51 turns on the trigger circuit 15, initiating an output wave. Each pulse 61 turns off the trigger circuit 15, terminating the output wave. The trigger circuit is designed so that the negative pulses 53 and 63 do not operate it. It will be apparent without illustration that the negative pulses may be prevented if desired, from reaching the trigger circuit by rectifiers.

Figure 7:

The output of the trigger circuit (see Figure 7) comprises a wave of rectangular form, each wave having a duration $t$. The average value of this output, shown by the dash line 71 in Figure 7, is proportional to the duration $t$ of each wave and is therefore proportional to the bearing $\theta$.

The voltage divider 23 is manually adjusted to provide, between its upper terminal and its tap, a voltage equal to the average voltage which would be produced by the trigger circuit 15 if the craft were on the desired course. The calibrations on the dial 29 are such that the bearing of this course is indicated.

As long as the craft is on the line corresponding to the selected bearing, the average voltage across the meter is zero. Fluctuations, resulting from the fact that the output of the trigger circuit is intermittent, are integrated by the mass of the moving parts of the meter. If this is not sufficient to prevent flickering of the meter needle, a capacitor 22 may be connected across the meter as shown.

If the craft gets off course, i. e. away from the selected bearing line, the phase angle $\theta$ between the reference and directional signals becomes either greater or smaller, increasing or decreasing the pulse delay $t$ and changing the average value of the output of the trigger circuit 15. This causes the meter 19 to deflect to the left or right, according to the direction of the deviation.

In addition to serving as a course deviation or L—R indicator as described above, the system of Figure 1 may be used to determine the bearing from a range station. This is done by rotating the shaft 25 until the meter 19 reads zero. The pointer 27 will then show the bearing on the scale 29.

It should be noted that there is no confusion between reciprocal courses in the operation of the described system. One setting, and one only, of the shaft 25 corresponds to any course between zero and 360 degrees. However, at zero (or 360°), the reference and directional signals are exactly in phase. Thus the pulses applied to the trigger circuit coincide, and the trigger may not turn on at all, or may remain on continuously. This may cause violent fluctuation of the meter 19 from one extreme to the other. This phenomenon does not affect the accuracy of the system, and in fact provides a very distinct indication of the zero degree course.

The above-mentioned fluctuations at the zero degree course may be avoided by using only the alternate positive pulses derived from the reference and directional phase signals. Referring to Figure 2, wherein elements corresponding to those of Figure 1 are designated by corresponding reference numerals, the outputs of the limiters 9 and 17 are applied to two-to-one frequency dividers 31 and 33 respectively. The frequency dividers 31 and 33 may be multivibrator circuits, scale-of-two counter circuits, or any other known means for doubling the pulse repetition periods. The remainder of the system is like that of Figure 1, except that the calibration of the scale 29 extends over twice the angular range, i. e. comprises two sectors each representing the full 360 degrees of azimuth, one starting where the other ends.

In the operation of the system of Figure 2, pulse trains are produced like those in the system of Figure 1. However, the pulse repetition periods are $2/\alpha$, instead of $1/\alpha$. The maximum phase delay between the reference and directional signals is, as before, one full cycle of these signals, or $$t_{max} = \frac{1}{\alpha}$$

The maximum delay between the reference and directional pulse trains can never be any more than $1/\alpha$, or one-half the pulse repetition period. Consequently, the pulses applied to the two inputs of the trigger circuit 15 will not coincide under any conditions, and no violent meter fluctuations will occur.

It is evident that in the system of Figure 2 there are two possible settings of the bearing selector shaft 25 for any particular bearing; however, this causes no ambiguity, since the indication on the scale 29 will be the same for both settings.

Thus the invention has been described as an improved course indicator system for omnidirectional radio ranges. In contrast to the prior art systems using phase shifters and phase comparators, the subject system derives pulse trains from the range signals, actuating a trigger circuit one way by the pulses from the reference signal and the other way by the pulses from the directional signal. This provides a wave whose average value corresponds to the bearing, and which is compared with an adjustable voltage to provide L—R course indication.

I claim as my invention:

1. A course indicator for omnidirectional radio range systems of the type which provides a reference phase signal and a directional phase signal, both of said signals being of the same frequency and one being delayed in phase with respect to the other by an amount corresponding to azimuth, including means responsive to said signals to produce two respective pulse trains each having a repetition frequency one half the frequency of said signals and one delayed with respect to the other by a period which corresponds to said phase delay of one of said signals with respect to the other; a trigger circuit, including means responsive to pulses of one of said trains to initiate output waves, and means responsive to pulses of the other of said trains to terminate said output waves; a source of voltage, a meter connected to said source and to said trigger circuit, means for adjusting said voltage to produce, together with the output of said trigger circuit, a predetermined deflection of said meter, and means for indicating the adjustment of said source in terms of azimuth.

2. A course indicator for omnidirectional radio range systems of the type which provides a reference phase signal and a directional phase signal, both of said signals being of the same frequency and one being delayed in phase with respect to the other by an amount corresponding to azimuth, including means responsive to said signals to produce two respective pulse trains each having a repetition frequency one half the frequency of said signals and one delayed with respect to the other by a period which corresponds to said phase delay of one of said signals with respect to the other; a trigger circuit, including means responsive to pulses of one of said trains to initiate output waves, and means responsive to pulses of the other of said trains to terminate said output waves; a source of voltage, means for adjusting said voltage, means for comparing said voltage with the output of said trigger circuit, and means for indicating the adjustment of said source in terms of azimuth.

3. A course indicator to be carried in a mobile craft and used in a navigation system which includes an omnidirectional radio range transmitter, comprising a receiver responsive to the transmitter to provide a reference phase signal and a directional phase signal the relative phase of the signals being proportional to the azimuth angle between a reference line, such as north, and a line from the craft to the transmitter, means for converting said signals to respective trains of pulses, said pulse trains bearing a time relationship to each other which corresponds to the phase relationship between said signals; a trigger circuit, and means for applying said pulse trains to respective input points of said trigger circuit to provide output therefrom cyclically during intervals whose lengths correspond to the time relationship between said pulse trains; a source of voltage, a meter connected to said source and to said trigger circuit to be acted upon by any difference between the voltage provided by the former and the average output provided by the latter, means for adjusting said voltage to a value which is proportional to the angle between said reference line and a desired course line to said transmitter and which, together with the output of said trigger circuit, when the craft is positioned on said course, will act to produce a predetermined deflection of said meter, and means for indicating for different values to which the voltage of said source may be adjusted the different azimuth angles which are respectively proportional thereto thereby to designate different possible courses to said transmitter.

4. A course indicator to be carried in a mobile craft and used in a navigation system which includes an omnidirectional radio range transmitter, comprising a receiver responsive to the transmitter to provide a reference phase signal and a directional phase signal the relative phase of the signals being proportional to the azimuth angle between a reference line, such as north, and a line from the craft to the transmitter, means for converting said signals to respective trains of pulses, said pulse trains bearing a time relationship to each other which corresponds to the phase relationship between said signals; a trigger circuit, and means for applying said pulse trains to respective input points of said trigger circuit to provide output therefrom cyclically during intervals whose lengths correspond to the time relationship between said pulse trains; a source of voltage, means for adjusting said voltage to different values corresponding to any angle from zero degrees to 360 degrees, the trigger circuit being arranged and adjusted so that the value of its average output when said craft is positioned on any given course line toward said transmitter will have the same value as that to which said voltage is adjusted to correspond to an angle equal to the angle between said reference line and that given course, means for indicating the magnitude and polarity of any difference between said voltage and the average value of said trigger circuit output, and means for indicating for different values to which the voltage of said source may be adjusted the different angles corresponding thereto thereby to designate different possible courses to said transmitter.

SAMUEL GUBIN.

REFERENCES CITED

The following references are of record in the file of this patent:

UNITED STATES PATENTS

| Number | Name | Date |
|---|---|---|
| 2,208,377 | Luck | July 16, 1940 |
| 2,253,958 | Luck | Aug. 26, 1941 |
| 2,329,504 | Young | Sept. 14, 1943 |
| 2,370,692 | Shepherd | Mar. 6, 1945 |
| 2,403,527 | Hershberger | July 9, 1946 |
| 2,404,527 | Potapenko | July 23, 1946 |